Aug. 12, 1924.
M. J. NORDSTRAND
MIXING DEVICE
Filed May 17, 1923
1,504,704
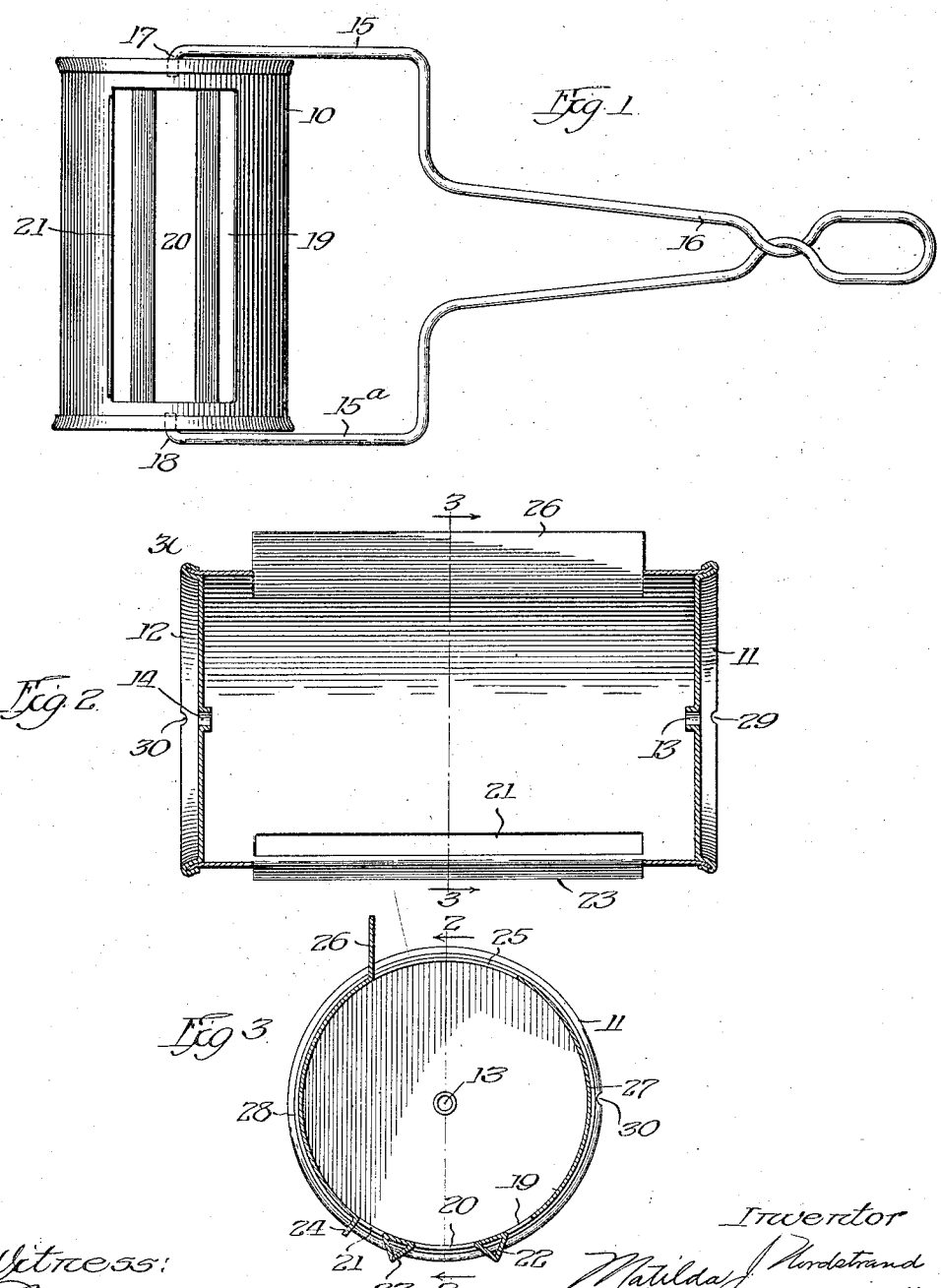

Patented Aug. 12, 1924.

1,504,704

UNITED STATES PATENT OFFICE.

MATILDA J. NORDSTRAND, OF CHICAGO, ILLINOIS.

MIXING DEVICE.

Application filed May 17, 1923. Serial No. 639,503.

*To all whom it may concern:*

Be it known that I, MATILDA J. NORDSTRAND, a citizen of the United States, residing at Chicago, in the county of Cook and State of Illinois, have invented certain new and useful Improvements in a Mixing Device, of which the following is a specification.

My invention relates to a mixing device and has particular reference to a device for use in mixing lard and flour together in the making of pastries, particularly in the mixing of the flour and lard preparatory to making the dough for pie crust.

The primary object of my invention is the provision of a mixing device in the form of a rotatably mounted cylindrical member having a plurality of narrow slots with cutting elements adjacent thereto through which the flour and lard are forced during the rotation of the said cylindrical member and having a discharge opening in the upper portion thereof and which will properly mix flour and lard together while these ingredients are in a mixing bowl or the like prior to the addition of water to this mixture in the making of pastry, such as pie dough, pie crust and the like, without bringing the hands of the mixer into contact with the mixture.

Another and further object of my invention is the provision of a mixing device which operates in such manner that flour and lard are mixed together in sheet-like formations, thus securing the flaky effect so much desired in the culinary art in the making of pastry.

It has become well known in the culinary art that in the making of pastry the less the materials are handled with the hands the lighter and more flaky-like will be the condition of the crust after it is baked. It has been common practice to mix lard and flour together by means of knives or spoons and ofttimes with the hands, which results in bringing together the particles of the flour and lard and in small pellet-like formations, and does not produce the light flaky effect of the crust so much sought in the baking of pastries.

With the use of my improved invention the mixing of the flour and lard in forming pastry, particularly pie crust, is accomplished, and the flour and lard are flattened or rolled together in sheets by portions of the peripheral surface of the mixing device and other portions cut through the sheets where they force the mixture up into the interior of the mixing chamber whereby through the rotation of the device it is further mixed and can then be emptied from a discharge opening at the top of the device and the device rotated back and forth in the mixture until the proper relationship between the flour and lard has been accomplished before adding the water to the mixture.

These and other objects of my invention will be more fully and better understood by reference to the accompanying sheet of drawings, in which—

Figure 1 is an elevational view of the bottom of my improved mixing device;

Figure 2 is a longitudinal sectional view through the center of the device; and

Figure 3 is a cross-sectional view on lines 3—3 of Figure 2.

Referring now specifically to the drawings, and in which like reference characters refer to like parts throughout, a cylinder designated as a whole as 10 is provided having end members 11 and 12 secured thereto in any convenient manner and forming closures for the member 10 at each of its ends. Members 11 and 12 have openings 13 and 14 centrally located therein within which a holding device comprising a pair of parallel extending portions 15 and 15$^a$ made of heavy wire is inserted, and which has a handle portion 16, the said handle 16 having a sufficient spring tension to hold the inturned terminals 17 and 18 of the portions 15 and 15$^a$ in engagement with the members 11 and 12 in the openings 13 and 14. The member 10 has a plurality of longitudinally extending openings 19, 20 and 21 in the bottom thereof, these openings being formed by longitudinal cuts made in the wall of the member 10 and bending portions of the wall outwardly and back so that a pair of triangular shaped cutting members 22 and 23 are formed extending parallel with the openings 19, 20 and 21, these members being pointed and serve to cut the sheet-like formations of lard and flour during the mixing operation. Adjacent the opening 21 is an outwardly turned portion 24 which also serves as a cutting element for the same function as the members 22 and 23. At the upper side of the member 10 is a transversely extending opening 25 in the wall thereof adjacent which is an out-turned portion 26 integral with the wall of the member 10, and which can be used as a scraper for heaping together the flour and lard as the mixing operation is performed, and for cleaning the mixing bowl, as may be desired.

It will be noted that between the discharge opening 26 at the top, and the longitudinal opening 19 at the bottom, is a smooth wall portion 27 and at the opposite side of the device is a corresponding wall portion 28, also smooth on its outer surface, these portions of the member 10 serving to flatten and smooth out the particles of lard and also flour and secure and mix these two ingredients together in a sheet-like formation.

In operation the device is quite simple, as the desired quantity of flour is placed in a mixing bowl and the necessary quantity of lard added thereto, whereupon the operator by grasping the handle 16 and moving the device back and forth over the upper surface and down into the mixture flattens and smooths the ingredients into sheet-like formation, strips of which are cut out by the cutting elements and forcing the strips up into the interior of the cylinder, and superimposing these strips one upon the other and at the same time rolling out into sheet-like formation other portions of the flour and lard by bringing into contact therewith the smooth portions 27 and 28 of the member 10. As the portion 10 is filled up the device is turned over and the contents emptied into the bowl, whereupon the operation of working the device into the mixture and rolling it back and forth is continued and as the mixing device becomes filled it is continuously emptied until the flour and lard are thoroughly mixed together.

A pair of notches 29 and 30 are provided in the end members 11 and 12 so that the operator by squeezing upon the handle portion 16 forces the members 15 and 15ª into engagement with one or the other of these notches, thereby preventing rotation of the member 10, allowing for ease of emptying the device and counter-balancing any rotation which the member 10 may have due to the material being located at one or the other sides of the member 10, and also serving to hold the member 10 stationary while the portion 26 is used for scraping and heaping the portions of flour and lard together, or for cleaning purposes after the mixing operation is complete.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. A dough mixer comprising in combination, a cylindrical member having a mixing opening in its side wall, a discharge opening oppositely disposed with relation to said mixing opening, and a handle on which said cylindrical member is mounted.

2. In a dough mixing device comprising in combination a cylindrical member having a plurality of mixing openings in its outer wall and a discharge opening at the opposite side thereof, cutting elements positioned adjacent the said mixing openings and a handle upon which said device is mounted.

3. In a dough mixing device comprising in combination a rotatable cylindrical member having longitudinally extending mixing openings in the side wall thereof and a discharge opening in the side wall thereof oppositely disposed with relation to the said mixing openings and having a plurality of plain surfaces between the said mixing openings and the discharge opening, and a handle upon which said cylindrical member is rotatably mounted.

4. In a dough mixing device comprising in combination a rotatable cylindrical member having longitudinally extending mixing openings in the side wall thereof and a discharge opening in the side wall thereof oppositely disposed with relation to the mixing openings and having a plurality of cutting elements along the marginal edges of the said mixing openings and the discharge opening and a handle upon which said cylindrical element is rotatably mounted.

5. In a dough mixing device, the combination of a rotatably mounted cylindrical member having mixing openings in the side wall thereof and having a discharge opening oppositely disposed from said member with respect to said mixing openings, cutting elements adjacent the said mixing openings, and a spring handle member upon which said rotatable element is mounted, the said cutting elements being formed by turning outward a portion of the wall of the cylindrical member.

6. In a dough mixing device, the combination of a cylindrical member having a plurality of mixing openings in the side thereof, a plurality of cutting elements adjacent said mixing openings, a pair of end members upon which said cylindrical member is mounted, a handle to which said cylindrical member is rotatably secured and means carried by said end members for engagement with the said handle for preventing rotation of the mixing device.

7. In a dough mixing device, the combination of a cylindrical member having a plurality of mixing openings in the side thereof, a plurality of cutting elements adjacent said mixing openings, a pair of end members upon which said cylindrical member is mounted, and a handle to which said cylindrical member is rotatably secured, the said end members having recesses therein adapted to receive the handle whereby rotation of the said cylindrical member is prevented.

8. A dough mixing device comprising in combination, a rotatable cylindrical member having a plurality of mixing slots in its peripheral wall with portions of said wall positioned between said openings, a discharge opening in the said cylinder oppositely positioned with respect to said mixing openings, and a handle upon which the said cylindrical member is mounted.

Signed at Chicago, Illinois, this 11th day of May, 1923.

MATILDA J. NORDSTRAND.